United States Patent
Leonard

(10) Patent No.: US 7,505,573 B2
(45) Date of Patent: Mar. 17, 2009

(54) INMATE CALLED PARTY PREPAID CARD METHOD AND SYSTEM

(75) Inventor: Rhonda Leonard, Forest Park, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 912 days.

(21) Appl. No.: 11/119,557

(22) Filed: May 2, 2005

(65) Prior Publication Data

US 2006/0245563 A1  Nov. 2, 2006

(51) Int. Cl.
*H04M 15/00* (2006.01)
(52) U.S. Cl. .............................. 379/114.2; 379/114.17; 379/144.01; 379/144.06; 379/155
(58) Field of Classification Search .............. 379/92.03, 379/92.04, 93.02, 93.03, 100.04, 400.05, 379/111, 114.01, 114.05, 114.15, 114.17, 379/114.2, 115.01, 115.02, 132, 144.01, 379/144.05, 144.06, 154, 155
See application file for complete search history.

(56) References Cited

U.S. PATENT DOCUMENTS

| 4,935,956 | A | * | 6/1990 | Hellwarth et al. ...... 379/144.02 |
| 5,210,789 | A | * | 5/1993 | Jeffus et al. ............ 379/127.01 |
| 5,448,625 | A | * | 9/1995 | Lederman ................ 379/88.25 |
| 5,627,887 | A | * | 5/1997 | Freedman .............. 379/114.21 |
| 5,859,900 | A | * | 1/1999 | Bauer et al. ............ 379/114.21 |
| 5,870,723 | A | * | 2/1999 | Pare et al. ...................... 705/39 |
| 6,009,150 | A | * | 12/1999 | Kamel ...................... 379/88.22 |
| 6,611,583 | B1 | | 8/2003 | Gainsboro |
| 6,636,591 | B1 | | 10/2003 | Swope et al. |
| 6,639,977 | B1 | * | 10/2003 | Swope et al. ........... 379/114.21 |
| 6,665,380 | B1 | | 12/2003 | Cree et al. |
| 6,668,045 | B1 | | 12/2003 | Mow |
| 6,795,540 | B1 | | 9/2004 | Mow |
| 7,158,621 | B2 | * | 1/2007 | Bayne ................... 379/114.13 |
| 2003/0086546 | A1 | | 5/2003 | Falcone et al. |
| 2003/0198325 | A1 | | 10/2003 | Bayne |
| 2004/0029564 | A1 | | 2/2004 | Hodge |

* cited by examiner

*Primary Examiner*—Binh K Tieu
(74) *Attorney, Agent, or Firm*—Brooks Kushman P.C.

(57) ABSTRACT

A system for enabling an inmate to make a telephone call to a called party telephone located outside of a correctional facility includes a facility network having inmate and prepaid platforms associated with a PSTN. A called party provides the prepaid platform with information regarding a prepaid card purchased by the called party and the called party telephone number. The prepaid platform associates the telephone number with a prepaid account of the called party, determines value of the prepaid card based on its information, and then transfers the value to the prepaid account. An inmate uses an inmate telephone within the facility to make a telephone call to the called party telephone via the PSTN. The network completes the call if the call is authorized, the called party has a prepaid account associated with the telephone number, and the value of the prepaid account is sufficient for paying for the call.

20 Claims, 3 Drawing Sheets

INMATE CALLED PARTY PREPAID CARD METHOD AND SYSTEM

BACKGROUND OF THE INVENTION

1. Field of the Invention

The present invention generally relates to telephone communications between inmates of correctional facilities and persons located outside of the facilities such as family and friends of the inmates. More particularly, the present invention relates to telephone communications methods and systems in which a person located outside of a correctional facility prepays for the cost of calls made from an inmate of the facility to the person. The present invention further relates to telephone communications methods and systems in which a person located outside of a correctional facility establishes a prepaid account from which funds are paid to a telephone service provider for the cost of calls made from an inmate of the facility to the person.

2. Background Art

Inmates of correctional facilities such as prisons typically do not have their own telephone services. Inmates rely on telephone services made available by the facilities in order to make telephone calls to persons such as family and friends located outside of the facilities. Inmates typically are limited with respect to when, how long, with whom, etc., they may make telephone calls. For example, inmates may be required to provide facilities with a list of persons (such as family and friends) that they would like to be able to call. In turn, the facilities review and approve each person and associated telephone number on the lists before the inmates are authorized to be able to establish telephone communications with these persons. Requiring such approved lists is to prevent inmates from making unauthorized telephone calls to persons such as victims, judges, law enforcement, etc.

Inmates generally lack access to funds with which to pay for telephone calls made by the inmates to persons outside of the facilities (i.e., the called parties). Prepaid calling cards and the like are generally not available to inmates. Thus, a problem associated with inmates making telephone calls to called parties is arranging payment to the telephone service provider for the calling costs.

A solution to this problem is for the inmates to make collect calls to the called parties. In this event, the telephone service provider subsequently bills the called parties for the costs of the calls. However, a problem for the called parties is that the costs of collect calls are typically much higher than the costs of ordinary calls. A further problem for both the telephone service provider and the called parties is that called parties in this market segment usually lack the resources for paying the costs of collect calls or do not have proper credit ratings to establish credit accounts with the telephone service provider. Thus, the telephone service provider causes the telephones of many called parties to be collect call restricted.

Collect calls are not enabled to be made to telephones having telephone numbers that are collect call restricted. In this case, the called parties having collect call restricted telephones do not have the option of designating calls from inmates as collect calls to be paid for by the called parties. As a result, if an inmate attempts to place a collect call from prison to a telephone number that is collect call restricted, then the call is not completed. In this case, the called party may be contacted and advised of the requirement to establish a prepaid account in order to receive calls from the inmate. The called party can then fund the prepaid account by the use of a credit/debit card or a check. However, again, a problem is that called parties in this market segment often do not have credit cards, checking accounts, etc., and therefore must use other non-popular payment methods (such as money orders and wire transfers) in order to fund their prepaid accounts. Such non-popular payment methods require more time and effort by the called parties to use to establish and fund their prepaid accounts and have relatively high transaction fees.

DETAILED DESCRIPTION OF THE PREFERRED EMBODIMENT(S)

Figure 1:
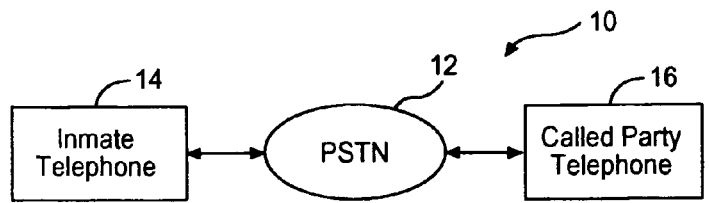
FIG. 1 illustrates a block diagram of a communications network for use with the inmate called party prepaid card method and system of the present invention.

The inmate called party prepaid card method and system in accordance with the present invention has many advantages. In general, the method and system in accordance with the present invention provide an easier, more ubiquitous, and less expensive way in which a called party can fund a prepaid account which is used to pay for the costs of telephone calls made from an inmate to the called party. As a result, the number of called parties that establish such prepaid accounts will likely increase. In turn, telephone calls made by inmates to called parties which would not have otherwise been completed will be completed.

In accordance with the method and system of the present invention, a called party (i.e., a party to be or being called by an inmate of a correctional facility) purchases a prepaid card in order to fund a prepaid account. The prepaid account is administered by an administrator such as the telephone service provider that enables telephone services for the called party. Alternatively, the administrator may be a third party that is responsible for paying the telephone service provider for the costs of calls completed from the inmate to the called party. The called party effectively prepays for the calls made from the inmate to the called party by funding the prepaid account. Funds from the prepaid account of a called party are used to pay the telephone service provider for the costs of these calls made from an inmate to the called party.

In accordance with the method and system of the present invention, prepaid cards for funding prepaid accounts are made available to the called parties for purchase. For example, a called party is able to purchase a prepaid card from sources such as merchants and vending machines (which may be located in the correctional facilities and at other strategic locations). In accordance with the method and system of the present invention, the prepaid cards have a monetary face value such as $10, $20, $50, etc., and have an associated personal identification number (PIN).

After purchasing a prepaid card, the called party scratches off the prepaid card PIN (similar to regular prepaid cards), dials a toll-free number listed on the prepaid card in order to contact the administrator, and then provides the administrator with the prepaid card PIN and the called party's telephone number. The called party then transfers the monetary value of the prepaid card to the prepaid account of the called party using the telephone number of the called party as the prepaid account number.

Subsequently, when an inmate attempts to place a collect call from prison to the called party, an inmate call processor platform in accordance with the method and system of the present invention determines whether the telephone call is collect call restricted. If so, the inmate platform transfers the call attempt to a prepaid call processor platform in accordance with the method and system of the present invention. The prepaid platform determines whether a prepaid account is established and funded for funding the costs of calls made from the inmate to the called party. If so, the pre paid platform completes the call from the inmate to the called party. The prepaid platform monitors the duration of the call and then transfers funds from the prepaid account to the telephone service provider for payment of the calling costs. Alternatively, if the inmate knows that a prepaid account for funding calls between the inmate and the called party is already setup, then the inmate can initiate a prepaid call directly to the called party by dialing a special access code for direct access to the prepaid platform.

Referring now to FIG. 1, a block diagram of a communications network 10 for use with the inmate called party prepaid card method and system of the present invention is shown. Communications network 10 includes a public switched telephone network (PSTN) 12 which is in communication with a correctional facility telephone 14 and a called party telephone 16. Telephone 14 is a telephone located within a correctional facility such as a prison. Inmates of the facility share and have access to telephone 14 in order to make telephone calls to persons (i.e., called parties) located outside of the facility. Telephone 16 is representative of telephones located outside of the facility. For example, telephone 16 represents the telephone of the relative of a first inmate, the telephone of the friend of a second inmate, the telephone of the attorney of a third inmate, etc. These persons located outside of the facility use their telephones 16 to receive telephone calls made by the inmates.

To this end, an inmate (i.e., the originating party or the calling party) uses telephone 14 (i.e., the originating inmate telephone) to initiate a telephone call as a typical collect call to a person located outside of the facility (i.e., a called party). In order to establish the telephone call, the inmate uses telephone 14 to dial the telephone number of telephone 16 belonging to the called party (i.e., the terminating called party telephone). In accordance with the method and system of the present invention, PSTN 12 is enabled to complete the call from inmate telephone 14 to called party telephone 16 if the called party has prepaid for the cost of the call.

Figure 2:
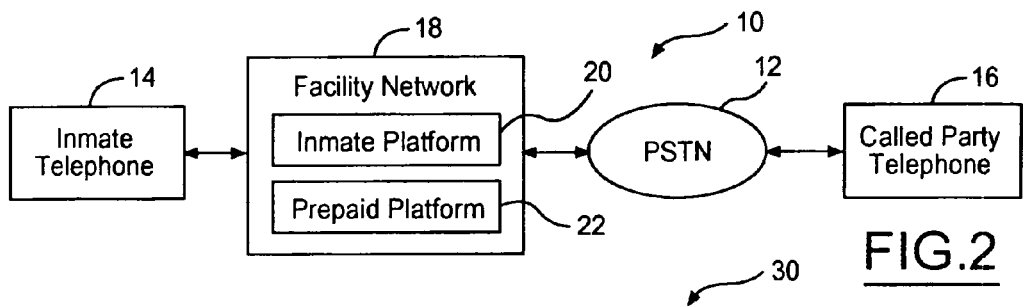
FIG. 2 illustrates a more detailed block diagram of the communications network shown in FIG. 1.

Referring now to FIG. 2, with continual reference to FIG. 1, a more detailed block diagram of communications network 10 is shown. As shown in FIG. 2, communications network 10 further includes a correctional facility network 18 interposed between inmate telephone 14 and called party telephone 16. FIG. 2 illustrates facility network 18 as being interposed between inmate telephone 14 and PSTN 12. This illustration corresponds with facility network 18 being a network associated with the correctional facility and not being part of PSTN 12. Of course, facility network 18 in its entirety or a portion thereof may be incorporated as part of PSTN 12. In this case, facility network 18 or a portion thereof would be shown in FIG. 2 as being within the PSTN 12.

Facility network 18 generally includes an inmate call processor platform 20 and a prepaid call processor platform 22. In general, inmate platform 20 is responsible for checking to see if a telephone number dialed by an inmate on inmate telephone 14 is an authorized telephone number for the inmate to call. That is, inmate platform 20 checks to make sure that an inmate using inmate telephone 14 to call a called party is authorized to make the call to the called party. Put in another way, inmate platform 20 ensures that a called party is on the approved calling list of the inmate when the inmate calls the called party. Another general responsibility of inmate platform 20 is to record telephone conversations made between inmate telephone 14 and any telephones 16 of called parties.

In general, prepaid platform 22 is responsible for enabling establishment and funding of prepaid accounts for paying the costs of telephone calls made by inmates using inmate telephone 14 to called party telephones 16. Prepaid platform 22 is responsible for validating prepaid cards which are purchased by called parties for funding the prepaid accounts of the called parties. Prepaid platform 22 is responsible for transferring the value of prepaid cards purchased by called parties to the prepaid accounts of the called parties. Prepaid platform 22 is responsible for determining whether a prepaid account is established and funded for telephone calls made by an inmate using inmate telephone 14 to telephone 16 of a called party. If so, facility network 18 enables a telephone call made by an inmate using inmate telephone 14 to be connected to telephone 16 of a called party. Prepaid platform 22 is further responsible for transferring funds from the prepaid account to a telephone service provider in order to pay for the costs associated with the telephone call made between the inmate and the called party.

Figure 3:
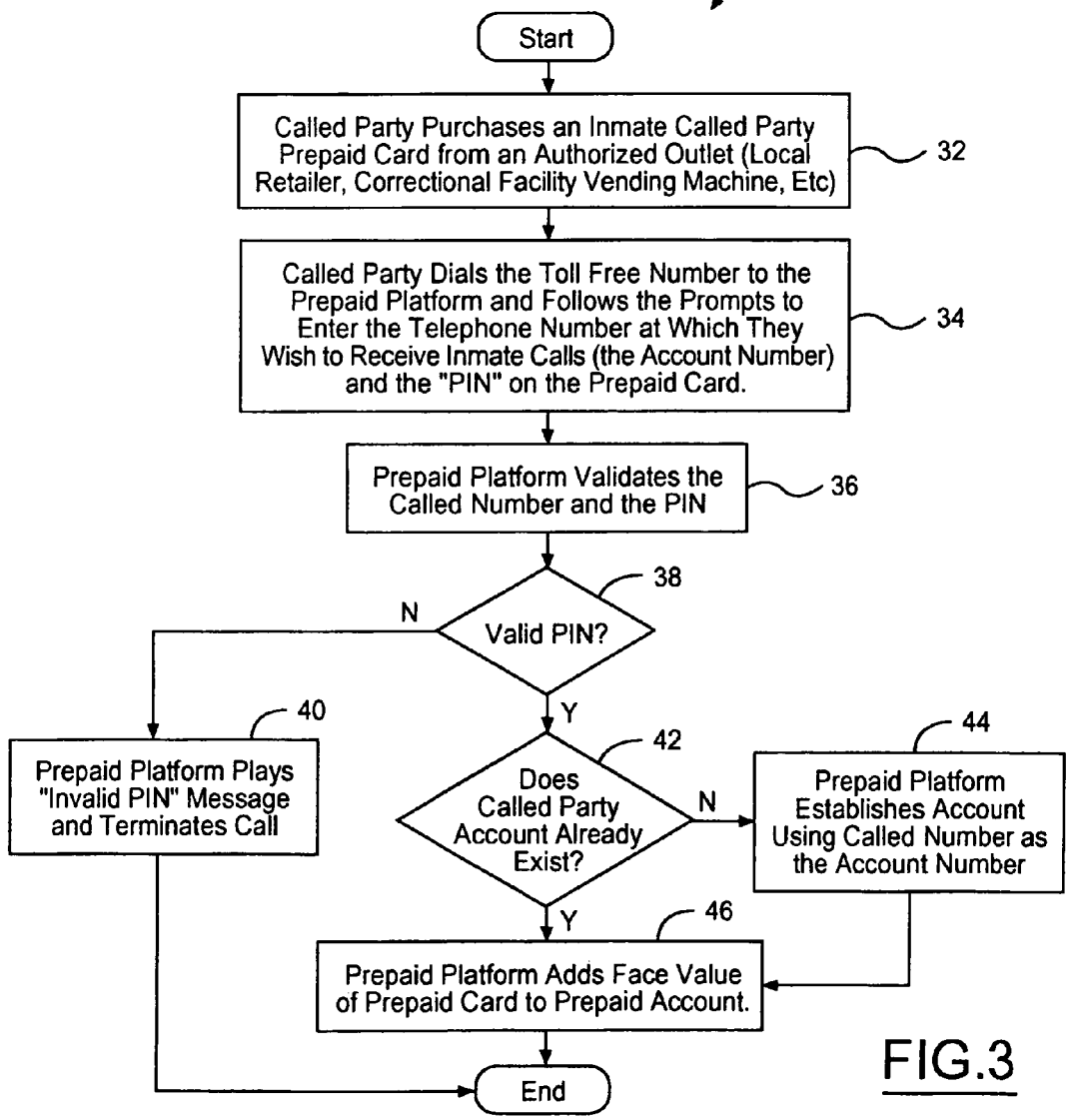
FIG. 3 illustrates a flowchart describing operation carried out by the method and system of the present invention for enabling a called party to establish and fund a prepaid account which is used to pay for the costs of telephone calls made from an inmate to the called party.

Referring now to FIG. 3, with continual reference to FIG. 2, a flowchart 30 describing operation carried out by the method and system of the present invention for enabling a called party to establish and fund a prepaid account which is used to pay for the costs of telephone calls made from an inmate to the called party is shown. The operation illustrated in flowchart 30 includes a called party purchasing a prepaid card (i.e., "an inmate called party prepaid card") from an authorized outlet (such as a local retailer, correctional facility vending machines, etc.) as shown in block 32.

The called party then uses a telephone and dials a toll-free telephone number listed on the prepaid card as shown in block 34. The toll-free telephone number is the telephone number of prepaid platform 22 of facilities network 18. As such, the called party telephones prepaid platform 22. During the telephone call with prepaid platform 22, the called party provides the prepaid platform with the telephone number of the telephone 16 of the called party at which the called party desires to receive telephone calls from an inmate. Prepaid platform 22 assigns the telephone number of called party telephone 16 as the account number of a prepaid account of the called party. In accordance with the present invention, funds from the prepaid account of the called party are used to pay for the costs of telephone calls made from the inmate to the called party. The called party further provides prepaid platform 22 with the PIN of the prepaid card and an inmate access code. The called party may interact with prepaid platform 22 by talking with a human operator or by following voice prompts such as used with interactive voice response (IVR) systems.

In turn, as shown in block 36, prepaid platform 22 validates the telephone number provided by the called party and validates the prepaid card PIN provided by the called party.

Prepaid platform 22 validates the telephone number provided by the called party to ensure that it is the telephone number of a telephone 16 being allowed access to telephone calls from inmate telephone 14. Prepaid platform 22 determines if the prepaid card PIN is valid as shown in decision block 38. Prepaid platform 22 has access to a database which stores the PINs of valid prepaid cards. The PIN of a prepaid card identifies the prepaid card as being valid and identifies the monetary value of the prepaid card. If prepaid platform 22 determines that the prepaid card PIN provided by the called party is not valid, then the prepaid platform plays an "invalid PIN" message for the called party to hear and terminates the call with the called party as shown in block 40.

If prepaid platform 22 determines that the prepaid card PIN provided by the called party is valid, then the prepaid platform determines whether a prepaid account already exists for the called party as shown in decision block 42. If a prepaid account does not exist for the called party, then prepaid platform 22 establishes a prepaid account using the telephone number of the called party as the account number for the prepaid account as shown in block 44. Prepaid platform 22 then adds the monetary face value of the prepaid card to the prepaid account of the called party as shown in block 46. Prepaid platform 22 further associates any inmate access code provided by the called party with the prepaid account of the called party. If a prepaid account does exist for the called party, then prepaid platform 22 adds the monetary face value of the prepaid card to the prepaid account of the called party as shown in block 46.

Figure 4:
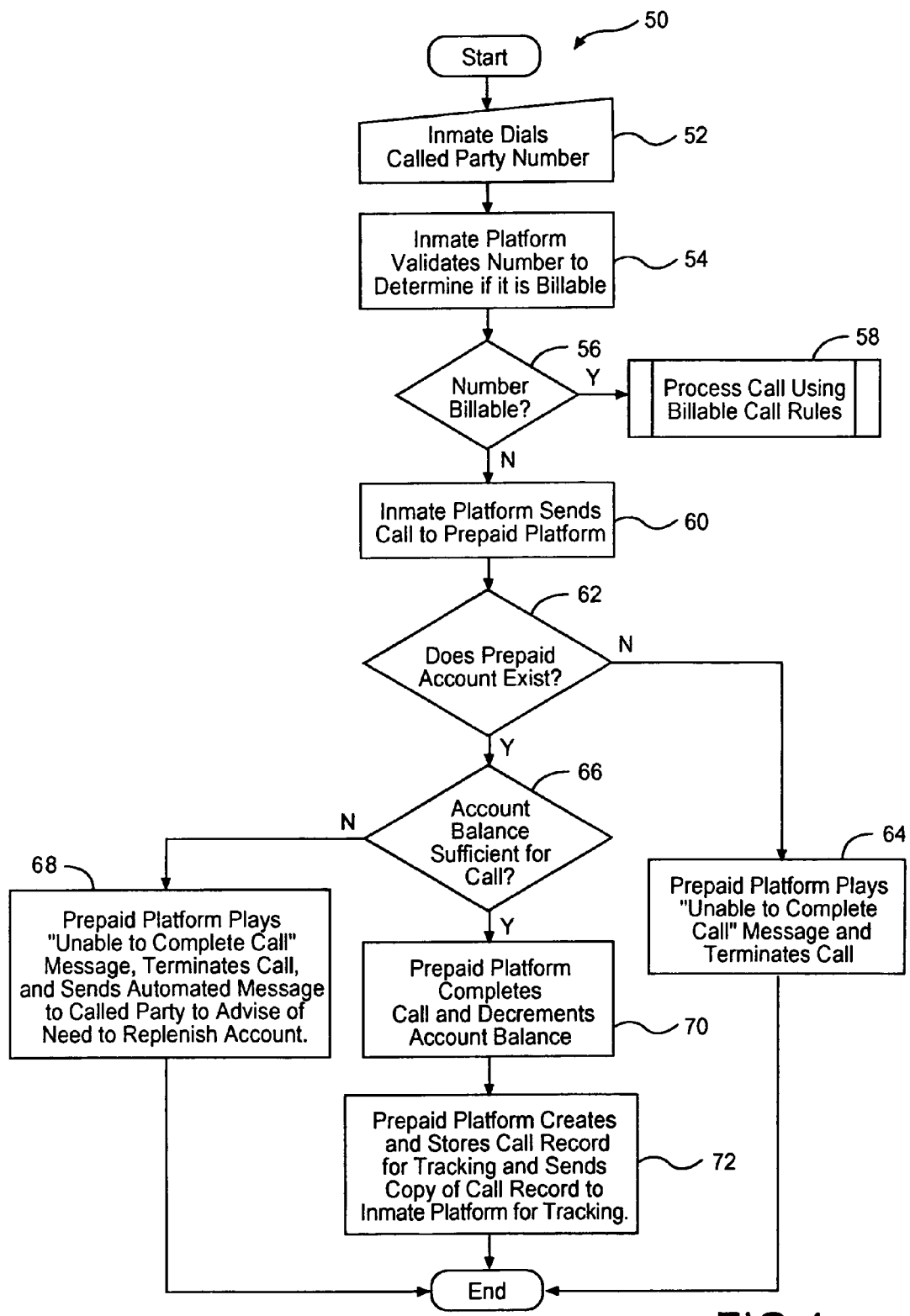
FIG. 4 illustrates a flowchart describing operation carried out by the method and system in accordance with a first embodiment of the present invention upon an inmate making a telephone call to a called party.

Referring now to FIG. 4, with continual reference to FIGS. 2 and 3, a flowchart 50 describing operation carried out by the method and system in accordance with a first embodiment of the present invention upon an inmate making a telephone call to a called party is shown. The operation illustrated in flowchart 50 includes an inmate using inmate telephone 14 to dial the telephone number of a telephone 16 of a called party as shown in block 52. Inmate platform 20 of facilities network 18 is in communication with inmate telephone 14 and initially processes the telephone number of the called party as provided by the inmate in order to determine whether the telephone call from the inmate to the called party is authorized. Inmate platform 20 determines the telephone call to be authorized if the telephone number of the called party is on an approved calling list of the inmate or of the correctional facility. Inmate platform 20 then validates the dialed telephone number to determine if the telephone call from the inmate to the called party is billable as shown in block 54. In decision block 56, inmate platform 20 determines if the telephone call from the inmate to the called party is billable. If so, then facilities network 18 processes the telephone call from inmate telephone 14 to called party telephone 16 using billable call rules as shown in block 58. If not, then inmate platform 20 directs the telephone call to prepaid platform 22 as shown in block 60.

In turn, prepaid platform 22 determines whether a prepaid account of the called party exists for funding the costs of the telephone call made by the inmate to the called party as shown in decision block 62. If a prepaid account does not exist for funding the costs of the telephone call made by the inmate to the called party, then prepaid platform 22 plays an "unable to complete call" message for the inmate to hear and terminates the telephone call as shown in block 64.

If a prepaid account does exist for funding the costs of the telephone call, then prepaid platform 22 determines whether the balance of the prepaid account is sufficient for paying for the costs of the telephone call as shown in decision block 66. If the prepaid account lacks a sufficient balance, then prepaid platform 22 plays an "unable to complete call" message for the inmate to hear and terminates the telephone call as shown in block 68. Prepaid platform 22 further sends an automated message to the called party advising the called party of the terminated telephone call and of the need of the called party to replenish funds into the prepaid account as shown in block 68.

If the prepaid account has a sufficient balance, then prepaid platform 22 completes the telephone call between inmate telephone 14 and called party telephone 16 thereby enabling the inmate to call the called party as shown in block 70. Prepaid platform 22 may additionally require prior to completing the telephone call that an inmate access code provided by the inmate or the correctional facility to inmate platform 20 at the time of making the telephone call to the called party matches the inmate access code associated with the prepaid account of the called party. Prepaid platform 22 monitors usage of the telephone call and decrements the balance of prepaid account accordingly to pay for the costs of the telephone call as shown in block 70. Prepaid platform 22 then creates and stores a call record of the telephone call as shown in block 72. Prepaid platform 22 transfers a copy of the call record to inmate platform 18 for the inmate platform to track as shown in block 72.

Figure 5:
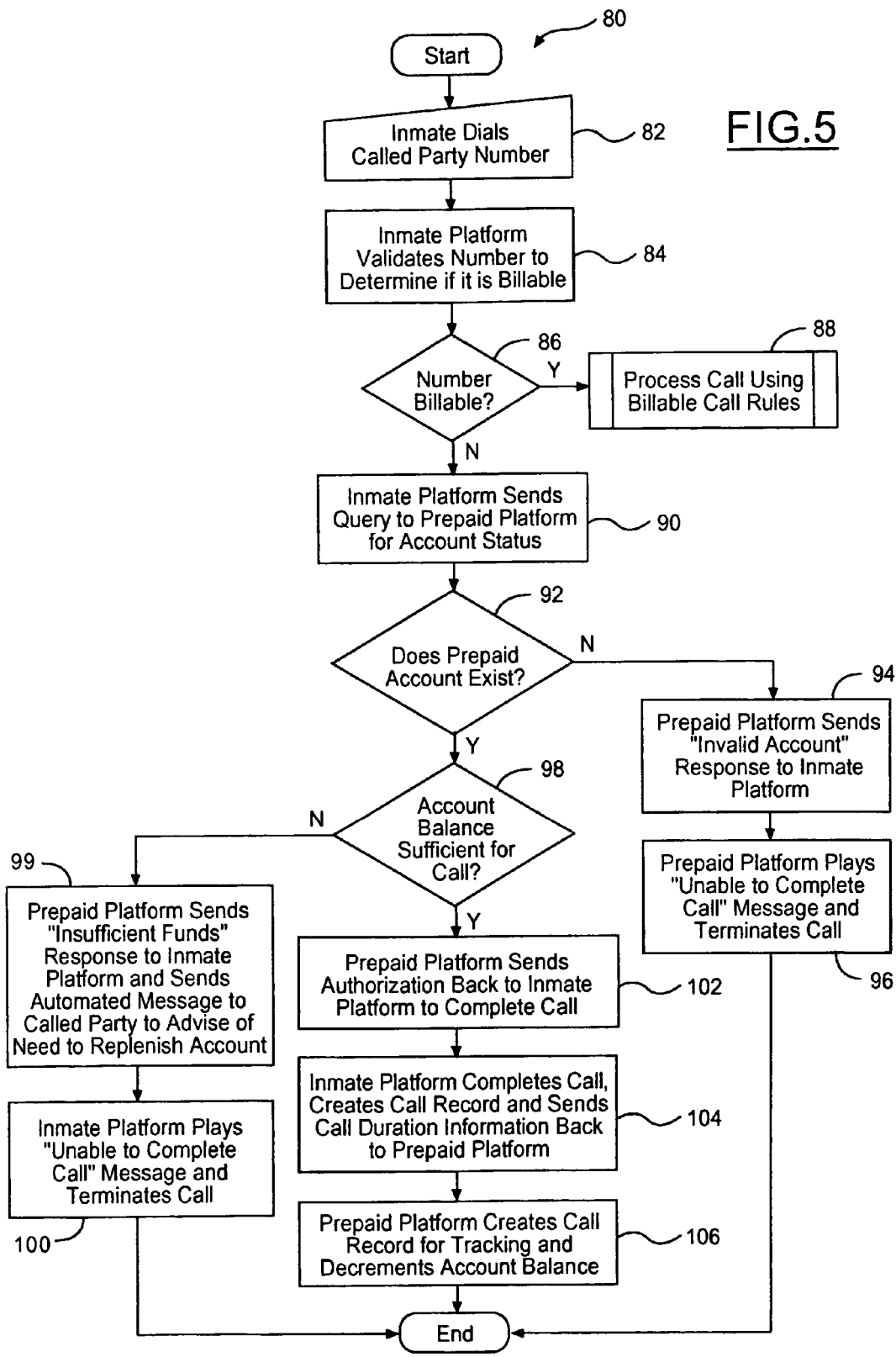
FIG. 5 illustrates a flowchart describing operation carried out by the method and system in accordance with a second embodiment of the present invention upon an inmate making a telephone call to a called party.

Referring now to FIG. 5, with continual reference to FIGS. 2 and 3, a flowchart 80 describing operation carried out by the method and system in accordance with a first embodiment of the present invention upon an inmate making a telephone call to a called party is shown. The operation illustrated in flowchart 80 includes an inmate using inmate telephone 14 to dial the telephone number of a telephone 16 of a called party as shown in block 82. Inmate platform 20 of facilities network 18 is in communication with inmate telephone 14 and processes the telephone number of the called party as provided by the inmate in order to validate the dialed telephone number to determine if the telephone call from the inmate to the called party is billable as shown in block 84. In decision block 86, inmate platform 20 determines if the telephone call from the inmate to the called party is billable. If so, then facilities network 18 processes the telephone call from inmate telephone 14 to called party telephone 16 using billable call rules as shown in block 88.

If not, then inmate platform 20 sends a query to prepaid platform 22 for the status of any called party prepaid account established and funded for paying the costs of the telephone call from the inmate to the called party as shown in block 90. In turn, prepaid platform 22 determines whether a prepaid account of the called party exists for funding the costs of the telephone call made by the inmate to the called party as shown in decision block 92. If a prepaid account does not exist for funding the costs of the telephone call made by the inmate to the called party, then prepaid platform 22 sends an "invalid account" response to inmate platform 20 as shown in block 94. In turn, inmate platform 20 plays an "unable to complete call" message for the inmate to hear and terminates the telephone call as shown in block 96.

If a prepaid account of the called party for funding the costs of the telephone call does exist, then prepaid platform 22 determines whether the balance of the prepaid account is sufficient for paying for the costs of the telephone call as shown in decision block 98. If the prepaid account lacks a sufficient balance, then prepaid platform 22 sends an "insufficient funds" response to inmate platform 20 as shown in block 99. Prepaid platform 22 further sends an automated message to the called party advising the called party of the terminated telephone call and of the need of the called party to replenish funds into the prepaid account as shown in block 99.

In turn, inmate platform 20 plays an "unable to complete call" message for the inmate to hear and terminates the telephone call as shown in block 100.

If the prepaid account has a sufficient balance, then prepaid platform 22 sends an authorization back to inmate platform 20 to complete the telephone call from inmate telephone 14 to called party telephone 16 as shown in block 102. In turn, inmate platform 20 completes the telephone call, monitors usage of the telephone call, creates a call record, and sends call duration information back to prepaid platform 22 as shown in block 104. Prepaid platform 22 then creates the call record for tracking and decrements the balance of prepaid account accordingly to pay for the costs of the telephone call as shown in block 106.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for enabling an inmate to make a telephone call to a called party, the method comprising:
   purchasing, by a called party, a prepaid card having a monetary value and a personal identification number (PIN);
   providing, by the called party to an administrator of the prepaid card, the PIN of the prepaid card and a telephone number of the called party;
   associating, by the administrator, an account number matching the telephone number of the called party, as provided with the PIN of the prepaid card by the called party, with a prepaid account of the called party;
   determining, by the administrator, the monetary value of the prepaid card using the PIN of the prepaid card as provided by the called party;
   transferring, by the administrator, the determined monetary value of the prepaid card to the prepaid account of the called party;
   dialing, by an inmate of a correctional facility using a telephone of the correctional facility, the telephone number of the called party for the inmate to make a telephone call to the called party;
   processing the telephone call from the inmate to the called party to determine whether to complete the telephone call, the processing including
      checking whether the called party has a prepaid account having an account number matching the telephone number of the called party;
      if the called party has a prepaid account having an account number matching the telephone number of the called party, then determining whether monetary value of the prepaid account of the called party is sufficient for paying for the costs of the telephone call; and
      if the monetary value of the prepaid account of the called party is sufficient for paying for the costs of the telephone call, then completing the telephone call from the inmate to the called party.

2. The method of claim 1 further comprising:
   disabling the telephone call from the inmate to the called party if the called party lacks a prepaid account having an account number matching the telephone number of the called party telephone, or if the monetary value of the prepaid account of the called party is insufficient for paying for the costs of the telephone call.

3. The method of claim 1 wherein:
   providing further includes providing, by the called party to the administrator, an inmate access code;
   associating further includes associating the inmate access code with the prepaid account of the called party.

4. The method of claim 3 further comprising:
   providing, by the inmate, the inmate access code upon dialing the telephone number of the called party using the telephone of the correctional facility;
   wherein processing the telephone call from the inmate to the called party further includes checking whether the called party has a prepaid account having an inmate access code matching the inmate access code provided by the inmate;
   wherein the method further comprises terminating the telephone call if the called party lacks a prepaid account having an inmate access code matching the inmate access code provided by the inmate.

5. The method of claim 1 further comprising:
   validating, by the administrator, the prepaid card by comparing the PIN of the prepaid card with reference prepaid card data;
   wherein transferring the determined monetary value of the prepaid card to the prepaid account of the called party is predicated on the prepaid card being valid.

6. The method of claim 5 further comprising:
   advising, by the administrator to the called party, that the prepaid card is invalid if the prepaid card is determined to be invalid.

7. The method of claim 6 further comprising:
   determining, by the administrator, whether the called party has a prepaid account having an account number matching the telephone number of the called party if the prepaid card is determined to be valid.

8. The method of claim 7 further comprising:
   if the called party lacks a prepaid account having an account number matching the telephone number of the called party, then establishing, by the administrator, the prepaid account of the called party using the telephone number of the called party as the account number of the prepaid account.

9. The method of claim 7 further comprising:
   if the called party already has a prepaid account having an account number matching the telephone number of the called party, then transferring, by the administrator, the monetary value of the prepaid card to the prepaid account of the called party.

10. The method of claim 1 wherein:
    purchasing, by a called party, a prepaid card includes the called party purchasing the prepaid card from a location within the correctional facility.

11. A system for enabling an inmate to make a telephone call to a called party, the system comprising:
    an inmate telephone located in a correctional facility;
    a called party telephone located outside of the correctional facility;
    a public switched telephone network (PSTN) enabling the inmate telephone and the called party telephone to be connected;
    a correctional facility network associated with the PSTN, the correctional facility network having an inmate platform and a prepaid platform;
    a prepaid card having a monetary value and a personal identification number (PIN);
    wherein a called party provides the prepaid platform the prepaid card PIN and a telephone number of the called party telephone via the PSTN;

wherein the prepaid platform associates an account number matching the telephone number of the called party telephone with a prepaid account of the called party, determines the monetary value of the prepaid card using the prepaid card PIN, and then transfers the determined monetary value of the prepaid card to the prepaid account of the called party;

wherein an inmate uses the inmate telephone to dial the telephone number of the called party telephone for the inmate to make a telephone call to the called party via the PSTN;

wherein the correctional facility network processes the telephone call from the inmate to the called party to determine whether to complete the telephone call via the PSTN, wherein the processing of the telephone call by the correctional facility network includes:

the inmate platform ensuring that the telephone call from the inmate to the called party is authorized, the prepaid platform checking whether the called party has a prepaid account having an account number matching the telephone number of the called party telephone and then determining whether monetary value of the prepaid account of the called party is sufficient for paying for the costs of the telephone call, the inmate platform enabling the telephone call from the inmate telephone to the called party telephone to be completed via the PSTN if the telephone call from the inmate to the called party is authorized, if the called party has a prepaid account having an account number matching the telephone number of the called party telephone, and if the monetary value of the prepaid account of the called party is sufficient for paying for the costs of the telephone call.

12. The system of claim 11 wherein:
the correctional facility network disables the telephone call from the inmate telephone to the called party telephone from being completed if the telephone call is unauthorized, if the called party lacks a prepaid account having an account number matching the telephone number of the called party telephone, or if the monetary value of the prepaid account of the card party is insufficient for paying for the costs of the telephone call.

13. The system of claim 12 wherein:
the correctional facility network plays an unable to complete call message for the inmate to hear on the inmate telephone upon disabling the telephone call from the inmate telephone to the called party telephone.

14. The system of claim 13 wherein:
the correctional facility network directs an automated message to the called party telephone via the PSTN advising the called party that the telephone call from the inmate telephone to the called party telephone has been disabled upon the correctional facility network disabling the telephone call from the inmate telephone to the called party telephone.

15. The system of claim 11 wherein:
the inmate platform obtains a list of telephone numbers of called party telephones which are authorized to receive telephone calls from the inmate telephone, wherein the inmate platform determines that the telephone call from the inmate telephone to the called party telephone is authorized if the telephone number of the called party telephone is on the list.

16. The system of claim 11 wherein:
the called party further provides the prepaid platform an inmate access code via the PSTN;
wherein the prepaid platform further associates the inmate access code with the prepaid account of the called party.

17. The system of claim 16 wherein:
the correctional facility network further processes the telephone call from the inmate to the called party by the inmate platform obtaining the inmate access code from the inmate telephone and the prepaid platform checking whether the called party has a prepaid account having an inmate access code matching the inmate access code obtained by the inmate platform, wherein the correctional facility network disables the telephone call from the inmate telephone to the called party telephone if the prepaid account lacks an inmate access code matching the inmate access code obtained by the inmate platform.

18. The system of claim 11 wherein:
the prepaid platform validates the prepaid card by comparing the PIN of the prepaid card with reference prepaid card data;
wherein the prepaid platform transfers the determined monetary value of the prepaid card to the prepaid account of the called party only if the prepaid card is valid.

19. The system of claim 18 wherein:
the correctional facility network advises the called party via the PSTN that the prepaid card is invalid if the prepaid platform determines the prepaid card to be invalid.

20. The system of claim 10 wherein:
the prepaid platform monitors usage of the telephone call from the inmate telephone to the called party telephone and transfers funds out from the prepaid account of the called party to pay for usage costs of the telephone call.

* * * * *